United States Patent [19]
Howell et al.

[11] 3,759,479
[45] Sept. 18, 1973

[54] MOLD APPARATUS FOR MAKING FOAMED-IN-PLACE DOUBLE-SKIN BUILDING PANEL

[75] Inventors: Norbert C. Howell, Connersville; Walter Tischuk, Richmond; Thomas M. Welsh, Connersville, all of Ind.

[73] Assignee: H. H. Robertson Company, Pittsburgh, Pa.

[22] Filed: Mar. 24, 1971

[21] Appl. No.: 127,615

Related U.S. Application Data

[60] Continuation-in-part of Ser. No. 71,493, Sept. 11, 1970, abandoned, which is a division of Ser. No. 732,689, May 28, 1968.

[52] U.S. Cl............ 249/95, 425/109, 425/123, 425/817
[51] Int. Cl............................................. B22d 19/04
[58] Field of Search................. 425/109, 123, 817; 249/33, 47, 95, 160

[56] References Cited
UNITED STATES PATENTS

| | | | |
|---|---|---|---|
| 3,135,640 | 6/1964 | Kepka | 425/817 |
| 326,878 | 9/1885 | Lemassena | 425/408 X |
| 3,248,758 | 5/1966 | Schmitz et al. | 425/408 |
| 3,431,331 | 3/1969 | Pincus et al. | 425/408 X |
| 3,396,430 | 8/1968 | Westcott | 425/109 |

Primary Examiner—H. A. Kilby, Jr.
Attorney—Harry B. Keck and George E. Manias

[57] ABSTRACT

Mold apparatus for making a double-skin construction panel of the type having spaced-apart inner and outer facing sheets and a foamed-in-place core filling the space between the facing sheets. The mold apparatus includes upper and lower mold platens which when assembled, present confronting, laterally offset, upper and lower U-shaped cavities. The cavities are adapted to receive the complementary facing sheets and to position them in fixed, juxtaposed, laterally offset relation.

20 Claims, 12 Drawing Figures

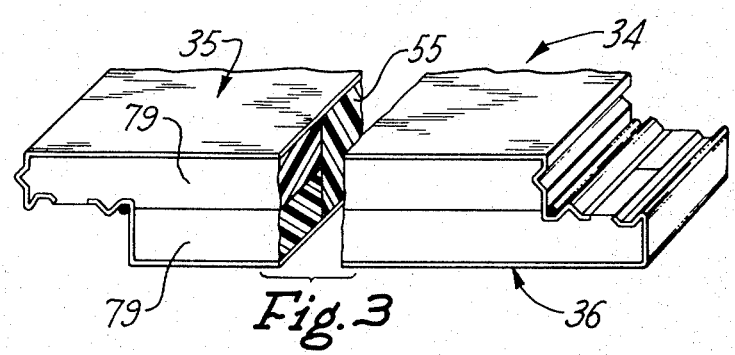
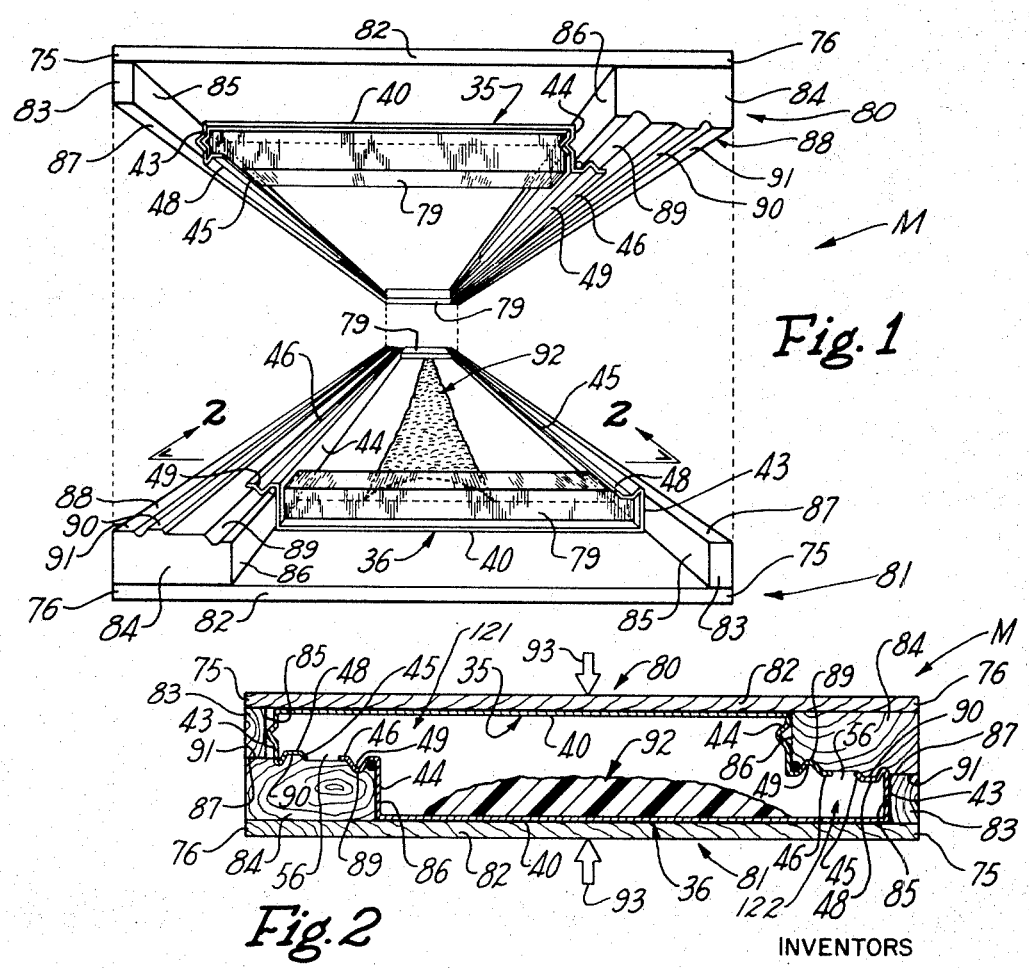

INVENTORS
NORBERT C. HOWELL
WALTER TISCHUK
THOMAS M. WELSH
BY
George E. Manias
AGENT

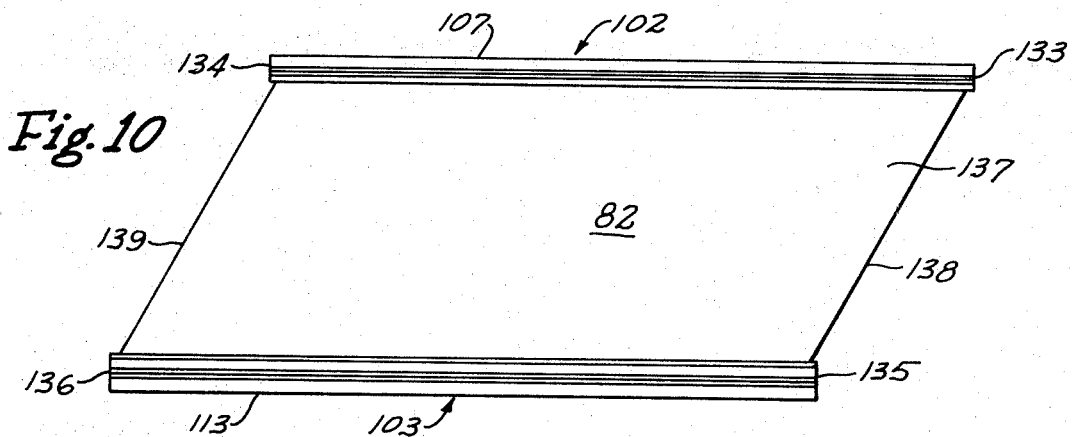
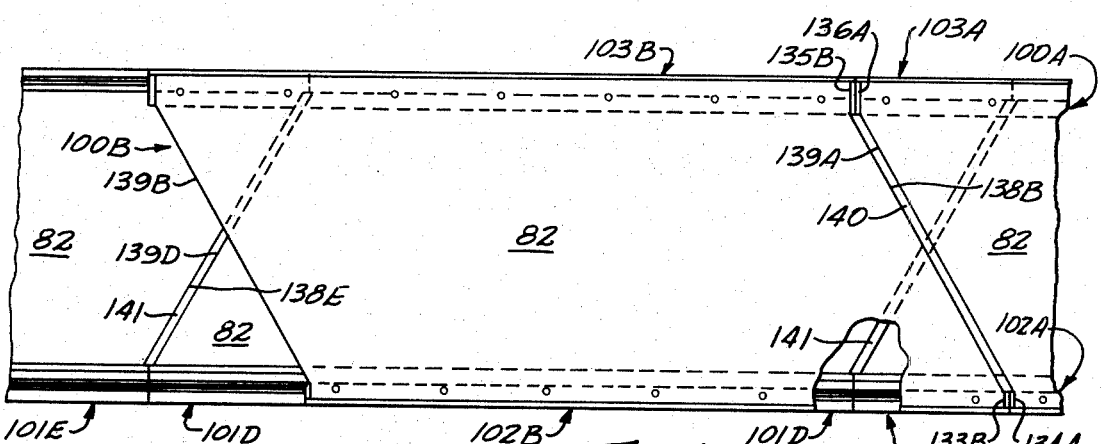
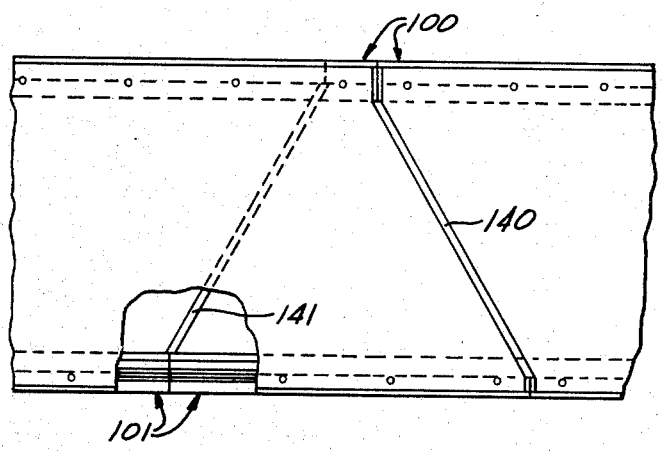

MOLD APPARATUS FOR MAKING FOAMED-IN-PLACE DOUBLE-SKIN BUILDING PANEL

CROSS-REFERENCES TO RELATED APPLICATION (IF ANY)

This application is a continuation-in-part application of copending application Ser. No. 71,493, filed Sept. 11, 1970 and now abandoned, which is a division of copending application Ser. No. 732,689, filed May 28, 1968 and assigned to the assignee of the present application.

BACKGROUND OF THE INVENTION

1. Field of the Invention

This invention relates to mold apparatus for making double-skin building construction panels having a foamed-in-place core.

2. Description of the Prior Art

Heretofore, double-skin building panels with a foamed-in-place plastics core have been fabricated in elaborate molding apparatus requiring complex molds and extensive pressure-retaining components for confining the appreciable pressures which are created by the expanding organic foam materials. See for example U. S. Pat. Nos. 2,866,730; 3,090,078; 3,203,042. In other instances the excessive pressure buildup of the rising organic foamed-in-place plastic core is avoided by deliberately providing insufficient foam to fill the open space of the panel, see for example Belgium Pat. No. 696,876.

SUMMARY OF THE INVENTION

The principal object of this invention is to provide simple and inexpensive mold platens for producing building panels.

Another object of this invention is to provide mold platens for positioning complementary facing sheets in fixed, juxtaposed, laterally offset relation and for confining the pressure of the rising foaming core materials in all directions.

The mold apparatus of this invention is particularly suited for the manufacture of building construction panels of the type having complementary inner and outer facing sheets and a plastic foam core which is formed by foamed-in-place techniques preferably from polyurethane. Each of the facing sheets includes a central web having side walls formed along the opposite longitudinal edges thereof and extending generally perpendicular therefrom. When assembled, the side walls of the outer facing sheet are laterally offset from the side walls of the inner facing sheet, that is the adjacent side walls are laterally spaced-apart, with a gap therebetween. The foamed-in-place plastic core is visible at each of the gaps.

In accordance with the present invention, relatively simple mold platens are provided, each including a mold plate having opposite ends and first and second opposite side portions. A side rail is secured to the mold plate along the first side portion and presents an upper surface remote from the mold plate. A spacer element is carried at one of the side portions of the mold plate. The mold platens are adapted to be assembled in confronting relation with the side rail of each mold platen confronting the second side portion of the confronting mold plate and with each spacer element positioned between the side rail of one mold platen and the opposing mold plate. When assembled, the mold platens present confronting, laterally offset, upper and lower generally U-shaped cavities, each defined by the mold plate, the spacer element and the side rail of each mold platen. Each of the cavities is adapted to receive one of the complementary facing sheets.

In accordance with one embodiment of the present invention, the overall length of the upper and lower mold platens may be equal to or greater than the overall length of the complementary facing sheets. The side rail of each mold platen is secured along one side portion of the mold plate while the spacer element is secured along the opposite side portion of the mold plate. When assembled, the spacer element of each mold plate engages a surface of the side rail of the opposing mold plate.

In accordance with an alternative embodiment of the present invention, the overall length of the upper and lower mold platens may be equal to or greater than the overall length of the complementary facing sheets. The side rail is secured to one of the side portions of the mold plate. In this embodiment, the spacer element is formed integrally with the side rail and is positioned to engage a face portion of the confronting mold plate.

In accordance with the further alternative embodiment of the present invention, upper and lower mold platens are provided each having an overall length which is substantially less than the overall length of the complementary facing sheets. The complementary facing sheets are positioned in fixed, juxtaposed, laterally offset relation by (1) a set of lower mold platens assembled in longitudinally aligned end-to-end relation and (2) a set of upper mold platens assembled in longitudinally aligned end-to-end relation. Each of the mold platens (upper or lower) is provided with a female side rail along one side portion of the mold plate and a male spacer element along the opposite side portion thereof. The portion of the mold plate extending between the female side rail and the male spacer element has a rhomboidal configuration in plan, including parallel opposite side portions and parallel opposite ends extending diagonally between the parallel side portions. The female side rail and the male spacer element include ends projecting beyond the corresponding ends of the mold plate. When adjacent mold platens are assembled, a gap is provided between the adjacent mold plates. The gap precludes the formation of mold marks in the facing sheet contained by the adjacent mold platens.

BRIEF DESCRIPTION OF THE DRAWINGS

FIG. 1 is an exploded perspective end view of two complementary mold platens, each carrying a facing sheet;

FIG. 2 is a cross-sectional view, as viewed along the lines 2—2 of FIG. 1, illustrating the complementary mold platens in assembled relation;

FIG. 3 is an isometric end view of a building panel illustrating the use of preformed end closures;

FIG. 10 is a plan view illustrating the interior face of a mold platen of FIG. 6;

FIG. 11 is a plan view illustrating a plurality of the mold platens of FIG. 6 assembled in end-to-end abutted relation; and FIG. 12 is a fragmentary plan view, similar to FIG. 11, illustrating an alternative arrangement.

DESCRIPTION OF THE PREFERRED EMBODIMENT(S)

Figure 4:
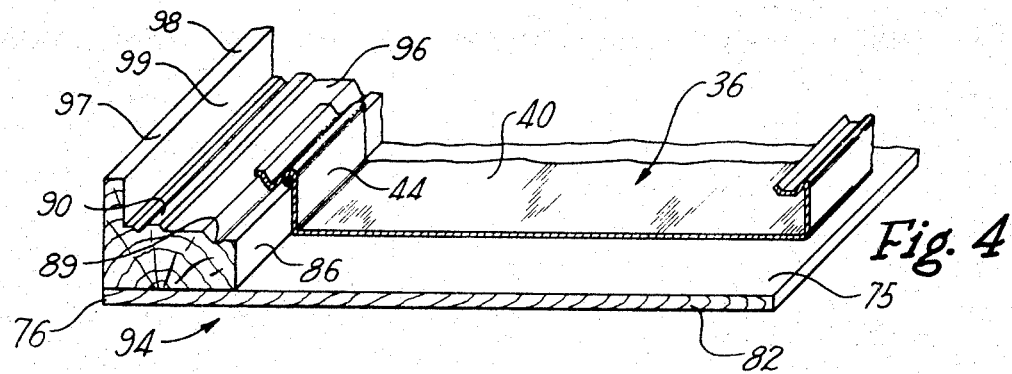
FIG. 4 is a fragmentary isometric view illustrating an alternative embodiment of a mold platen containing a facing sheet.

The mold apparatus of this invention is employed to produce a foamed-in-place double-skin building construction panel of the type described and illustrated in copending application Ser. No. 86,425, filed Nov. 3, 1970, which is a continuation-in-part of copending parent application Ser. No. 732,689, filed May 28, 1968. For a complete description of the building construction panel, reference is made to the aforesaid pending application Ser. No. 86,425. However, for the purposes of the present invention, it is believed sufficient to state that, as shown in FIG. 3, the present mold apparatus is employed to produce a building construction panel 34 comprising facing sheets 35, 36 and a foamed-in-place core 55 which completely fills the void space between the facing sheets 35, 36.

FIGS. 1 and 2 illustrate mold apparatus M comprising two relatively simple and identical upper and lower mold platens 80, 81. Each of the mold platens 80, 81 comprises a mold plate 82 provided with a side rail or spacer element 83 and a side rail 84 along its opposite longitudinal side portions 75, 76. The side rails 83, 84 present opposed second and first longitudinal faces 85, 86, respectively, which are laterally offset from one another and between which the facing sheets 35, 36 are press fitted and retained. The side rail 83 presents a plain face 87. The side rail 84 presents a contoured face 88 including a lengthwise depression 89, a lengthwise projection 90 and a plain surface portion 91. The spacer element 83 has a width which is less than that of the side rail 84.

When assembled, the upper and lower mold platens 80, 81 present confronting, laterally offset, upper and lower generally U-shaped cavities 121, 122, each defined by the mold plate 82, the second longitudinal face 85 of the spacer element 83 and the first longitudinal face 86 of the side rail 84. As shown in FIG. 2, the cavities 121, 122 receive the facing sheets 35, 36, respectively. Thus the mold apparatus M positions the complementary facing sheets 35, 36 in fixed juxtaposed, laterally offset relation.

The lengthwise depression 89 of the upper mold platen 80 is adapted to receive the lengthwise rib 49 provided in the second flange 46 of the facing sheet 35. The lengthwise depression 89 of the lower mold platen 81 is adapted to receive the lengthwise rib 49 provided in the second flange 46 of the facing sheet 36. The lengthwise projection 90 of the upper mold platen 80 is adapted to receive a lengthwise trough 48 of the first flange 45 of the facing sheet 36. The lengthwise projection 90 of the lower platen 81 is adapted to receive the lengthwise trough 48 of the first flange 45 of the facing sheet 35. The plain surface portions 91 of the side rails 84 of the upper and lower mold platens 80, 81 are positioned to engage the corresponding plain faces 87 of the side rails 83 of the lower and upper mold platens 81, 80. Preferably, the width of the upper mold platen 80 is substantially equal to the width of the lower mold platen 81.

When manufacturing the building panel 34, it is desireable to cap the opposite ends of the facing sheets 35, 36 to assure complete filling of the panels with the foamed-in-place core. As shown in FIGS. 1 and 3, the opposite ends of the facing sheets 35, 36 are provided with preformed end closures 79. When the facing sheets 35, 36 are brought together in opposed relation (FIG. 2), the preformed end closures 79 effectively seal the panel ends and assure that the foamed-in-place core 55 completely fills the void space between the engaged enclosures 79 and the facing sheets 35, 36.

During fabrication of the building panel, a quantity of actively foaming plastic composition 92 is distributed along the length of one of the facing sheets, in this instance the inner facing sheet 36. While the plastic composition is foaming, the upper mold platen 80 containing the complementary facing sheet 35, is engaged with the lower mold platen 81, as shown in FIG. 2. It should be readily apparent by inspection of FIG. 2, that the contoured surfaces 88 of the side rails 84 serve to align the complementary facing sheets 35, 36 is fixed juxtaposed, offset relation when the upper and lower mold platens 80, 81 are brought into assembled relation. The opposite first and second side walls 43, 44 of each of the facing sheets 35, 36 confine the expanding plastic composition 92 in a direction parallel to the central webs 40. Accordingly, only unidirectional restraining pressures, applied in the direction of the arrows 93 to the upper and lower mold platens 80, 81, are required by the present mold apparatus M. It will also be appreciated that the unidirectional restraining pressures applied against the upper and lower mold platens 80, 81 urge the opposed side rails 83, 84 into firm engagement with each other. The contoured side rails 84 thus serve to confine the expanding plastic composition 92 and prevent its expanding through the gaps 56 between the spaced-apart first and second flanges 45, 46 of the complementary facing sheets 35, 36.

Figure 5:
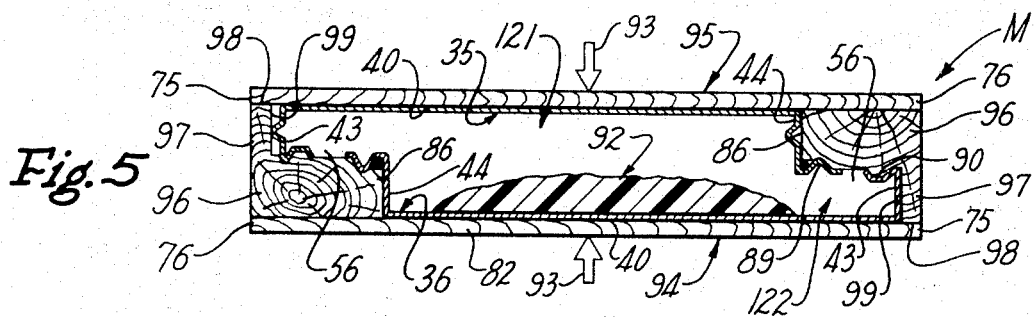
FIG. 5 is a cross-sectional view, similar to FIG. 2, illustrating two of the mold platens of FIG. 4 arranged in assembled relation.

An alternative embodiment of the present mold apparatus M is illustrated in FIGS. 4 and 5, wherein corresponding numerals are employed to identify corresponding parts heretofore described.

FIG. 4 illustrates a lower mold platen 94 carrying the facing sheet 36. FIG. 5 illustrates an upper mold platen 95 containing complementary facing sheet 35 and engaged with the lower mold platen 94. The lower and upper mold platens 94, 95 have identical configurations.

Each of the mold platens 94, 95 comprises a mold plate 82 provided with a side rail 96 along the longitudinal side portions 76. The side rail 96 includes a first longitudinal face 86, a lengthwise depression 89, a lengthwise projection 90 and a longitudinal extension or spacer element 97. The spacer element 97 presents a plain surface 98 and a second longitudinal face 9 which is laterally offset from the first longitudinal face 86. The spacer element 97 has a width which is less than that of the side rail 96.

When assembled, the mold platens 94, 95 present confronting laterally offset, upper and lower generally U-shaped cavities 121, 122 each defined by the mold plate 82, the second longitudinal face 99 of the spacer element 97 and the first longitudinal face 88 of the side rail 96. As shown in FIG. 5, each of the cavities 121, 122 receives one of the facing sheets 35, 36, respectively. Thus the mold apparatus M positions the complementary facing sheets 35 in fixed juxtaposed, laterally offset relation.

The mold platens 94, 95 receive the facing sheets 36, 35, respectively, with the central web 40 engaged with the mold plate 82 and with the second side wall 44 engaged with the face 86. When the mold platens 94, 95 are assembled (FIG. 5), the plain surfaces 98 of the spacer elements 97 engage the opposing mold plates 82 in the region of the side edge 75. The first side walls 43 of the facing sheets 35, 36 engage the faces 98 of the spacer elements 97. The side rails 96 serve to align the complementary facing sheets 35, 36 in juxtaposed, offset relation when the lower and upper molds 94, 95 are brought into assembled relation.

It will be noted that the upper and lower mold platens 80, 81 of the mold apparatus M illustrated in FIGS. 1, 2, are identical. Likewise, the upper and lower mold platens 94, 95 of the mold apparatus M illustrated in FIGS. 4, 5 are identical. It will be appreciated that the configuration of the mold plate 82 corresponds to the configuration of the central web of the facing sheet. Therefore, in that instance where, for example, the outer facing sheet has a profiled central web, the mold platen carrying the facing sheet will have a correspondingly profiled mold plate. In that instance the upper and lower mold platens differ with respect to the mold plates but are identical with respect to the side rail configuration.

During fabrication of the building panel, a quantity of actively foaming plastic composition 92 (FIG. 5) is distributed along the length of one of the facing sheets, in this instance the inner facing sheet 36. While the plastic composition 92 is foaming, the upper mold platen 95 containing the complementary facing sheet 35, is engaged with the lower mold platen 94, as shown in FIG. 5. The opposed first and second side walls 43, 44 of each of the facing sheets 35, 36 confine the expanding plastic composition 93 in a direction parallel with the central webs 40. Accordingly, only unidirectional restraining pressures, applied in the direction of the arrows 93 to the upper and lower mold platens 95, 94, are required by the present mold apparatus M. It will be appreciated that the unidirectional restraining pressures applied against the upper and lower mold platens 95, 94 urge the side rail 96 into firm engagement with the mold plates 82. The side rails 96 thus serve to confine the expanding plastic composition 92 and prevent its expanding through the gaps 56 (FIG. 5) between the spaced-apart first and second flanges 45, 46 of the complementary facing sheets 35, 36.

A further alternative embodiment of the present mold apparatus M is illustrated in FIGS. 6 to 12, wherein corresponding numerals are employed to identify corresponding parts heretofore described.

Figure 6:
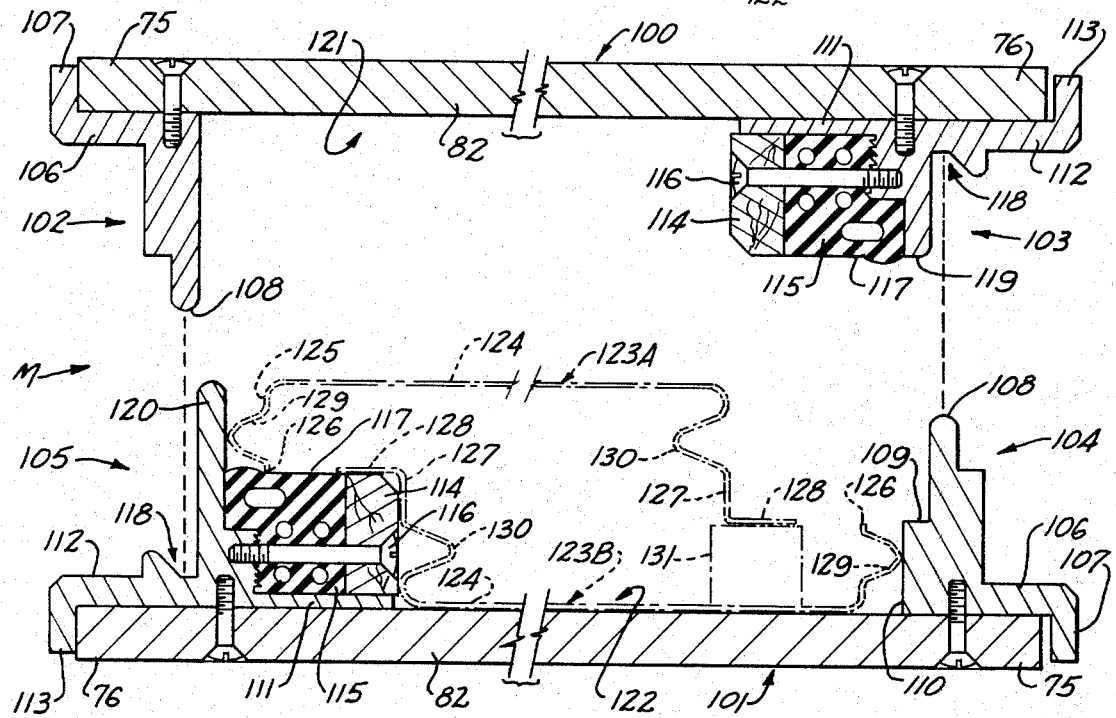
FIG. 6 is an exploded cross-sectional view illustrating a further alternative embodiment of complementary mold platens.
Figure 7:
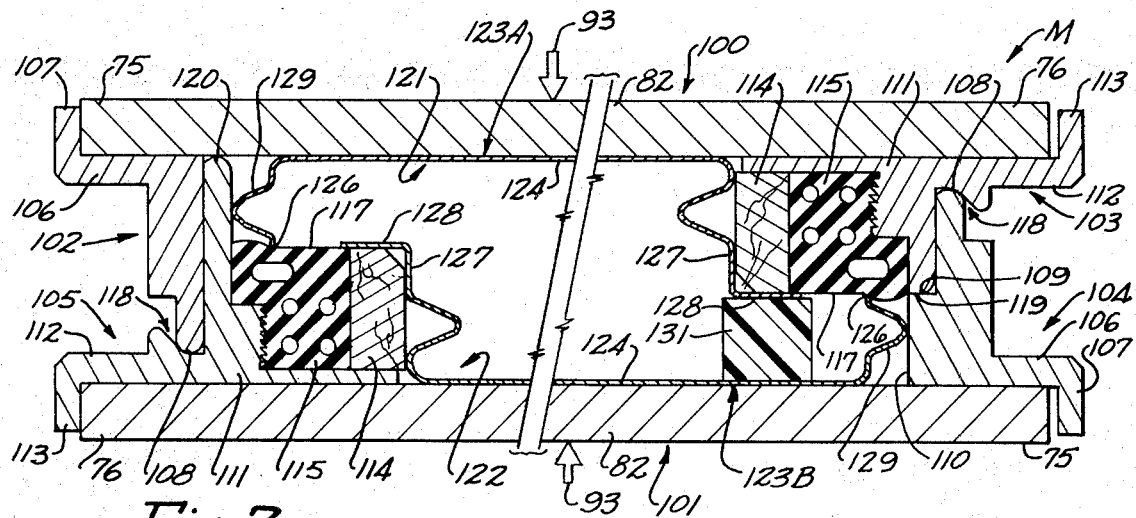
FIG. 7 is a broken, cross-sectional view, similar to FIG. 5, illustrating the mold platens of FIG. 6 arranged in assembled relation.
Figure 8:
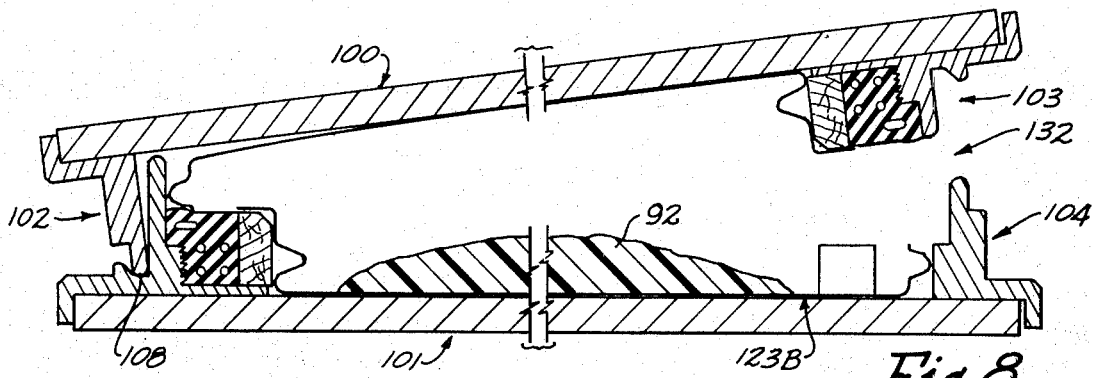
FIG. 8 is a broken, cross-sectional view, similar to FIG. 7, illustrating the position of the mold platens during the introduction of a quantity of actively foaming plastics composition.

FIGS. 6 and 7 illustrate upper and lower mold platens 100, 101 having substantially identical profiles. The upper mold platen 100 includes a male spacer element 102 secured to the side portion 75 of the mold plate 82 and a female side rail 103 secured to the opposite side portion 76 of the mold plate 82. The lower mold portion 101 includes a male spacer element 104 secured to the side portion 75 of the mold plate 82 and a female side rail 105 secured to the opposite side portion 76 of the mold plate 82.

The male spacer elements 102, 104 are similar and present a base 106 terminating in a flange 107, and a leading edge 108. The male spacer element 104 additionally presents a shoulder 109 and an inner surface or face 110. The male spacer elements 102, 104 may be formed from aluminum by conventional extrusion processes.

The female side rails 103, 105 are similar and comprise a body portion 111, a clamp block 114 and a gasket 115. The body portion 111 presents a base 112 overlying the edge portion 76 of the mold plate 82 and terminates in a flange 113. The gasket 115 is interposed between the body portion 111 and the clamp block 114. A fastener 116 extending through the clamp block 114 and the gasket 115 into threaded engagement with the body portion 111, clamps the gasket 115 in position. The gasket 115 presents a gasket surface 117 positioned for engagement by segments of the facing sheets to be enclosed by the mold platens 100, 101, as will be described. Each of the female side rails 103, 105 additionally present lengthwise recesses 118 positioned to receive the leading edge 108 of the confronting male spacer element 104, 102, respectively, see FIG. 7.

The female side rails 103, 105 differ from each other in the following respects. The female side rail 103 presents a shoulder 119 essentially coplanar with the gasket surface 117 and positioned for engagement with the shoulder 109 of the confronting male spacer element 104, see FIG. 7. The female side rail 105 of the lower platen 101, presents a lengthwise tongue 120 extending beyond the gasket surface 117 toward the mold plate 82 of the upper mold platen 100.

It will be observed in FIG. 6 that the upper mold platen 100 presents a generally U-shaped cavity 121 defined by the mold plate 82, the spacer element 102 and the side rail 103. Similarly, the lower mold platen 101 presents a U-shaped cavity 122 defined by the mold plate 82, the spacer element 104 and the female side rail 105. When the upper and lower mold platens 100, 101 are assembled (FIG. 7), the upper and lower generally U-shaped cavities 121, 122, thereof are disposed in confronting, laterally offset relation.

The upper and lower mold platens 100, 101 are particularly adapted to receive and position complementary upper and lower facing sheets 123A, 123B in fixed juxtaposed, laterally offset relation. For a complete description of the facing sheets 123 as well as other facing sheets which may be supported by the present mold apparatus, attention is directed to the aforesaid copending application Ser. No. 86,425. However, for the purposes of the present invention, it is believed sufficient to state that each of the facing sheets 123 includes a central web 124 having upstanding first and second side walls 125, 127 along the opposite longitudinal edges thereof. The first side wall 125 terminates in a first free edge 126. The second side wall 127 terminates in a flange 128 which extends laterally therefrom in a direction away from the central web 124. The flange 128 is essentially parallel with the central web 124. The first and second side walls 125, 127 are provided with complementary mating elements in the form of a convex rib 129 (first side wall 125) and a complementary concave rib 130 (second side wall 127).

As best shown in FIG. 6, the lower facing sheet 123B is introduced into the U-shaped cavity 122 with the convex rib 129 engaging the inner surface 110 of the male spacer element 104 with the flange 128 overlying the clamp block 114 and a portion of the gasket surface 117.

The complementary upper bacing sheet 123A is inverted and introduced into the lower mold cavity 101 such that the convex rib 129 thereof engages the lengthwise tongue 120 and with the free edge 126 thereof engaging the gasket surface 117. Plural preformed support members 131 (only one visible) are positioned at spaced locations along the length of the central web 124 of the lower facing sheet 123B to support the flange 128 of the upper facing sheet 123A. The support blocks 131 may be retained in position by a film of adhesive (not shown).

During the fabrication of the present building panel, the upper mold platen 100 (FIG. 8) may be tilted about the leading edge 108 of the male spacer element 102 to spread the female side rail 103 and the male spacer element 104 and thereby provide an opening 132 therebetween. A quantity of actively foaming plastic composition 92 introduced through the opening 132, is distributed along the length of the lower facing sheet 123B. While the plastic composition is foaming, the upper mold platen 100 is returned to the assembled relation illustrated in FIG. 7. It should be readily apparent by inspection of FIG. 7 that the interengagement of the leading edges 108 with the lengthwise recesses 118 lock the upper and lower mold platens 100, 101 together thereby preventing lateral displacement of the mold platen 100 relative to the mold platen 101. Each of the gaskets 115 seals the gap between the free edge 126 and the flange 128 of the complementary facing sheets 123, thereby confining the expanding plastic composition 92. Accordingly, only unidirectional restraining pressures, applied in the direction of the arrows 93 (FIG. 7) to the upper and lower mold platens 100, 101 are required by the present mold apparatus M. The unidirectional restraining pressures urge each of the male spacer elements 102, 104 into firm engagement with the confronting female side rail 105, 103, respectively.

Figure 9:
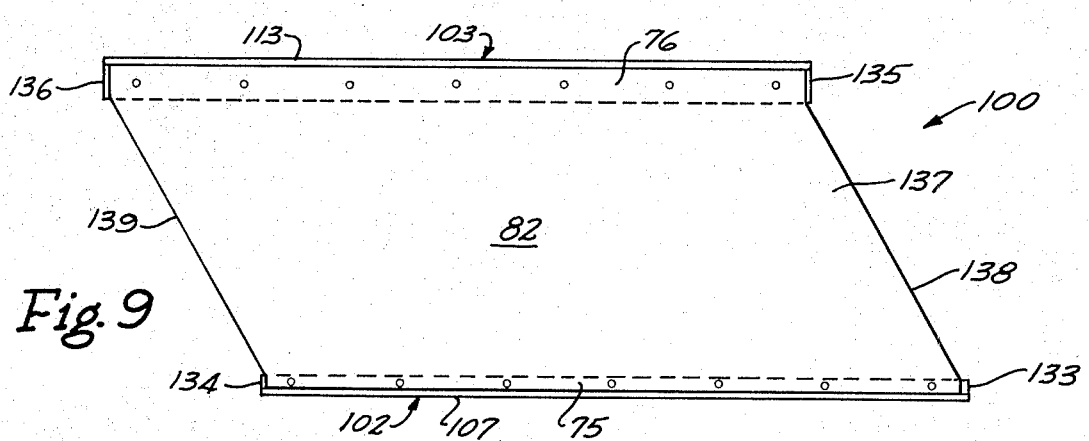
FIG. 9 is a plan view illustrating the exterior face of a mold platen of FIG. 6.

In accordance with the present invention, at least one and preferably both of the mold platens 100, 101 have the generally rhomboidal configuration illustrated in FIGS. 9 and 10. For the purpose of the present invention, FIGS. 9 and 10 illustrate the exterior face and the interior face, respectively, of the upper mold platen 100. It is to be understood that the following description applies equally to the lower mold platen 101.

It will be observed in FIG. 9 that the male spacer element 102 presents opposite ends 133, 134 extending beyond the corresponding ends of the mold plate 82. Similarly, the female side rail 103 presents opposite ends 135, 136 extending beyond the corresponding ends of the mold plate 82.

It will be observed in FIGS. 9 and 10 that the mold plate 82 presents a plate portion 137 extending between the male spacer element 102 and the female side rail 103. The plate portion 137 has a rhomboidal configuration including parallel side portions 75, 76 and parallel opposite ends 138, 139 extending diagonally between the parallel side portions 75, 76.

It is a convenient concept when describing the mold platen 100 to state that the male spacer element 102 (first mold plate side portion 75) is longitudinally offset relative to the female side rail 103 (second mold plate side portion 76).

Referring to FIG. 11, the upper mold platens 100 and the lower mold platens 101 are adapted to be assembled in separate sets wherein the mold platens are aligned in end-to-end abutted relation. For example, it will be observed in FIG. 11 that at the joint between adjacent upper mold platens 100A, 100B, the projecting ends 134A, 136A of the mold platen 100A abut the corresponding projecting ends 133B, 135B of the adjacent mold platen 100B. The overall arrangement is such that an oblique gap 140 is provided between the spaced-apart oblique ends 139B, 139A. It has been discovered that the provision of the oblique gap 140 precludes the formation of mold marks in the facing sheet contained in the mold platens 100A, 100B during the application of the unidirectional restraining pressures 93 (FIG. 7).

Referring still to FIG. 11, it will be appreciated that a similar oblique gap 141 is provided at the joint between adjacent lower mold platens 101C, 101D and 101D, 101E. The gaps 141 prevent the formation of the mold marks in the facing sheet contained in the lower mold platens 101.

The upper and lower mold platens 100, 101 may be assembled such that the oblique gaps 140 and 141 intersect as shown in FIG. 11. Alternatively, the upper and lower mold platens 100, 101 may be assembled such that the oblique gaps 140 and 141 are spaced-apart as shown in FIG. 12. It will be observed that in either arrangement, the opposite ends 138, 139 of the set of lower mold platens 101 are parallel to each other but are not parallel to the opposite ends 138, 139 of the set of upper mold platens.

It will also be appreciated that where the opposite ends 138, 139 of the mold platens 100, 101 are illustrated as straight ends, the opposite ends 138, 139 could, for special purposes be made arcuate.

We claim:

1. Mold apparatus for positioning complementary facing sheets in fixed, juxtaposed, laterally offset relation, said mold apparatus comprising
 a set of end abutted lower mold platens and a set of end abutted upper mold platens, each of said mold platens including:
  a mold plate having opposite ends and first and second opposite side portions;
  a side rail secured to the first side portion of said mold plate and presenting an upper surface remote from said mold plate; and
  a spacer element secured to the second side portion of said mold plate;
 said set of upper mold platens being assembled in opposed relation with said set of lower mold platens, with the spacer elements of each said set engaging the side rails of the other said set;
 said set of lower mold platens and said set of upper mold platens when assembled, presenting confronting, laterally offset, upper and lower generally U-shaped cavities having opposite ends open to the atmosphere, each of said cavities being defined by the mold plates, the spacer elements and the side rails of one said set, and each being adapted to receive one of said complementary facing sheets.

2. The mold apparatus defined in claim 1 wherein the mold platens of one said set present a lengthwise recess which is engaged by the confronting spacer element of the mold platens of the other said set thereby locking the mold platens against movement laterally of each other.

3. The mold apparatus defined in claim 2 wherein said lengthwise recess is presented by the lower mold platens, exteriorly of the lower U-shaped cavity.

4. The mold apparatus defined in claim 1 including a lengthwise tongue extending from the side rail of the lower mold platens above said upper surface toward the mold plate of the upper mold platens.

5. The mold apparatus defined in claim 1 wherein each said side rail comprises:
a body portion secured to said first side portion of the mold plate; and
a resilient gasket secured to said body portion within the U-shaped cavity;
said upper surface of each said rail being provided, at least in part, by said gasket.

6. The mold apparatus defined in claim 1 wherein the spacer element of said lower mold platens includes
a shoulder spaced-apart from the contiguous mold plate and disposed within the U-shaped cavity, said shoulder being engaged by the side rail of said upper mold platens.

7. The mold apparatus defined in claim 1 wherein said first and second side portions of the mold plates of one said set are longitudinally offset relative to each other; and
the opposite ends of the mold plates of said one set being obliquely presented with respect to said side portions.

8. The mold apparatus defined in claim 1 wherein the mold plates of one said set have a rhomboidal configuration.

9. The mold apparatus defined in claim 8 wherein the side rail and the spacer element of each mold platen of said one said set include
ends extending beyond the corresponding ends of the mold plate and engaging the side rail and the spacer element, respectively, of the adjacent mold platens,
whereby the confronting ends of adjacent mold platens are spaced-apart and present a gap therebetween.

10. The mold apparatus defined in claim 1 wherein said first and second side portions of the mold plates of each said set are longitudinally offset relative to each other; and wherein
the opposite ends of the mold plates are obliquely presented; with respect to said side portions;
whereby an end portion of each mold platen of one said set is presented in overlapping confronting relation with an end portion of an opposed mold platen of the other said set.

11. The mold apparatus defined in claim 1 wherein the mold plates of each said set have a rhomboidal configuration.

12. The mold apparatus defined in claim 11 wherein the side rail and the spacer element of each mold platen of each said set include
ends extending beyond the corresponding ends of the mold plate and engaging the side rail and the spacer element, respectively, of the adjacent mold platen, whereby the confronting ends of adjacent mold plates of each said set are spaced-apart and present a gap therebetween.

13. The mold apparatus of claim 1 wherein said opposite ends of said set of lower mold platens are parallel to each other but are not parallel to said opposite ends of said set of upper mold platens.

14. The mold apparatus of claim 1 including means presented by the mold platens of at least one said set for maintaining the confronting ends of ajdacent mold plates spaced-apart with a gap therebetween.

15. Mold apparatus for fixedly positioning complementary facing sheets in juxtaposed, laterally offset relation, comprising
mold platens, each including:
a mold plate having a first side portion and a second side portion;
a side rail secured to the said mold plate along said first side portion and presenting an upper surface remote from said mold plate, said side rail having a first longitudinal face extending between said upper surface and said mold plate, and positioned intermediate of the first and second side portions of said mold plate; and
a spacer element carried at one of said side portions of said mold plate and presenting a second longitudinal face;
said mold platens adapted to be assembled in opposed pairs (a) with the upper surface of each said side rail confronting the second side portion of the opposing mold plate and (b) with a said spacer positioned between the upper surface of each said side rail and the second side portion of the opposing mold plate and (c) with the second longitudinal face of each said spacer element laterally offset from the first longitudinal face of the adjacent side rail and (d) with the upper surface of each said side rail presented in confronting relation with the opposing mold plate;
said mold platens when assembled, presenting confronting, laterally offset, upper and lower generally U-shaped cavities, each defined by a said mold plate, the second longitudinal face of a said spacer element, and the first longitudinal face of a said side rail, said cavities being adapted to receive said complementary facing sheets and to retain the same in juxtaposed laterally offset, physically separated relation.

16. The mold apparatus defined in claim 15 wherein each said spacer element is secured to the said mold plate along the said second side portion thereof.

17. The mold apparatus defined in claim 15 wherein each said spacer element is connected to the said side rail above the said first side portion of said mold plate.

18. The mold apparatus defined in claim 15 wherein one of the mold platens presents a lenghtwise recess which is engaged by the confronting spacer element of the other mold platen thereby locking the mold platens against movement laterally of each other.

19. The mold apparatus defined in claim 18 wherein said lengthwise recess is presented by the lower mold platen exteriorly of the lower U-shaped cavity.

20. The mold apparatus defined in claim 15 wherein each said side rail comprises:
a body portion secured to said first side portion of the mold plate; and
a resilient gasket secured to said bdy portion within said U-shaped cavity;
said upper surface of each side rail being provided, at least in part, by said gasket.

* * * * *